United States Patent
Bang (10) Patent No.: US 10,527,723 B2
(45) Date of Patent: Jan. 7, 2020

(54) APPARATUS AND A METHOD FOR DRIVING AN ULTRASONIC SENSOR

(71) Applicant: HYUNDAI AUTRON CO., LTD., Seongnam-si (KR)

(72) Inventor: Sung Hoon Bang, Yongin-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 295 days.

(21) Appl. No.: 15/698,662

(22) Filed: Sep. 8, 2017

(65) Prior Publication Data
US 2018/0067207 A1   Mar. 8, 2018

(30) Foreign Application Priority Data
Sep. 8, 2016  (KR) .......... 10-2016-0115880

(51) Int. Cl.
  *G01S 15/10* (2006.01)
  *G01S 15/93* (2006.01)
  *G01S 7/527* (2006.01)

(52) U.S. Cl.
  CPC .......... *G01S 15/102* (2013.01); *G01S 7/527* (2013.01); *G01S 15/931* (2013.01); *G01S 2015/932* (2013.01)

(58) Field of Classification Search
  CPC ...... G01S 15/102; G01S 15/931; G01S 7/527; G01S 2015/932
  See application file for complete search history.

(56) References Cited

U.S. PATENT DOCUMENTS

| 6,009,380 | A | * | 12/1999 | Vecchio | .......... G01H 5/00 367/87 |
| 2015/0192449 | A1 | * | 7/2015 | Malinovskiy | ....... G01F 23/0076 342/124 |
| 2018/0067207 | A1 | * | 3/2018 | Bang | .......... G01S 7/527 |

(Continued)

FOREIGN PATENT DOCUMENTS

| CN | 107807361 A | * | 3/2018 | ............. G01S 7/527 |
| CN | 107918129 A | * | 4/2018 | ............. G01S 15/46 |

(Continued)

*Primary Examiner* — Daniel Pihulic
(74) *Attorney, Agent, or Firm* — Baker & Hostetler LLP; Hyunho Park (57) ABSTRACT

An apparatus for driving an ultrasonic sensor according to an embodiment of the present invention may comprise: a driving unit for providing a transmission pulse to the ultrasonic sensor to transmit an ultrasonic wave and for receiving an ultrasonic echo for the ultrasonic wave; an amplifier for amplifying an electrical signal for the ultrasonic echo; an analog-to-digital converter for converting the amplified electrical signal into an original digital signal; a signal processing unit for performing envelope-extraction-processing on the original digital signal and generating an envelope-extraction-processed signal; and a control unit for outputting a distance between the ultrasonic sensor and an external object based on the original digital signal and the envelope-extraction-processed signal, wherein the control unit monitors a frequency or phase change of vibration of a transducer of the ultrasonic sensor based on the original digital signal at least during a second period and analyses the envelope-extraction-processed signal during at least a third period.

10 Claims, 6 Drawing Sheets

(56) References Cited

U.S. PATENT DOCUMENTS

2018/0100921 A1* 4/2018 Bang .................. G01S 15/46
2018/0180732 A1* 6/2018 Sestok, IV ........... G01S 15/931
2019/0129028 A1* 5/2019 Bang .................. G01S 7/527

FOREIGN PATENT DOCUMENTS

| DE | 102017120682 A1 * | 3/2018 | ............ G01S 7/527 |
| DE | 102017123140 A1 * | 4/2018 | ............ G01S 15/46 |
| DE | 102018125951 A1 * | 5/2019 | ............ G01S 7/527 |
| JP | 2013-221755 A | 10/2013 | |
| KR | 10-2014-0096692 A | 8/2014 | |
| KR | 20180028330 A * | 3/2018 | ............ G01S 7/527 |
| KR | 20180039942 A * | 4/2018 | ............ G01S 15/46 |
| KR | 101887901 B1 * | 8/2018 | ............ G01S 7/527 |

\* cited by examiner

APPARATUS AND A METHOD FOR DRIVING AN ULTRASONIC SENSOR

CROSS-REFERENCE TO RELATED APPLICATIONS

This application claims priority to and the benefit of Korean Patent Application No. 10-2016-0115880 filed in the Korean Intellectual Property Office on Sep. 8, 2016, the entire contents of which are incorporated herein by reference.

TECHNICAL BACKGROUND OF THE INVENTION

1. Field of the Invention

The present invention relates to an ultrasonic sensor, and more particularly, to an apparatus and method for driving an ultrasonic sensor.

2. Background Art

Recently, automakers have intensively developed technologies related to vehicle safety and introduced vehicle products employing more advanced safety technologies to the market. The representative example of the advanced safety technologies is Advanced Driver Assistance Systems (ADAS), which is mainly used during parking a vehicle. In particular, Parking Assistance Systems (PAS) and an Automatic Parking Assistance Systems (APAS) among the ADAS are widely used to inform the distance between the vehicle and external objects. In these systems, a key technology is to exactly measure positions or distances of the external objects by using ultrasonic sensors mounted in the vehicle.

The ultrasonic sensor can sense ultrasonic echoes reflected from the external objects after transmitting ultrasonic waves having a frequency of 20 KHz or more, which is a non-audible range. And the ultrasonic sensor can measure distances to the external objects based on the sensed ultrasonic echoes. In this case, based on the measured distances, the driver of the vehicle can be informed in many ways such as a warning sound, an indication on the vehicle display, or the like. Accordingly, the safety of the driver and vehicle could be much enhanced through the ultrasonic sensor technologies.

However, the conventional distance measuring technology using the ultrasonic sensor had a lot of limitations in ranges or accuracy of sensing. In particular, the conventional ultrasonic sensors can receive actual ultrasonic echoes reflected from the external objects only after the complete stop of the physical vibration of the transducers of the ultrasonic sensors since the transducer continues to be vibrated for a while even when the ultrasonic sensor finishes to drive the transducer. Accordingly, it was very difficult to measure the distance of the external objects which are in very near positions from the ultrasonic sensor.

However, the demand for various applications requiring very accurate distance sensing with a wider sensing range than the existing ultrasonic sensors was more and more increasing. And, therefore, the improvement of the existing distance measuring systems has become very urgent. For example, in a narrow parking space, for more efficient parking, it is necessary to measure the distance shorter than the presently measurable distance.

Prior Art Document: Korean Unregistered Patent Application Publication No. 10-2005-0006750 (Issued Date: Jan. 17, 2005)

SUMMARY OF THE INVENTION

It is an object of the present invention to substantially obviate various problems caused by limitations and disadvantages of the prior art. More particularly, the object of the present invention is to provide an apparatus and a method for driving an ultrasonic sensor to more accurately measure a position of the distance from the very adjacent external objects.

In order to achieve the above object, an apparatus for driving an ultrasonic sensor according to an embodiment of the present invention may comprise: a driving unit for providing a transmission pulse to the ultrasonic sensor to transmit an ultrasonic wave and for receiving an ultrasonic echo for the ultrasonic wave; an amplifier for amplifying an electrical signal for the ultrasonic echo; an analog-to-digital converter for converting the amplified electrical signal into an original digital signal; a signal processing unit for performing envelope-extraction-processing on the original digital signal and generating an envelope-extraction-processed signal; and a control unit for outputting a distance between the ultrasonic sensor and an external object based on the original digital signal and the envelope-extraction-processed signal, wherein the control unit monitors a frequency or phase change of vibration of a transducer of the ultrasonic sensor based on the original digital signal at least during a second period and analyses the envelope-extraction-processed signal during at least a third period provided that there are a first period in which the transducer is vibrated according to the transmission pulse, the second period in which the transducer is self-vibrated after the provision of the transmission pulse is stopped, and the third period in which the transducer stops the self-vibration, and wherein the control unit outputs the distance between the ultrasonic sensor and the external object determined based on a time of flight between an initial detecting time and a transmission time of the ultrasonic wave, the initial detecting time being determined when the frequency or phase change of the transducer of the ultrasonic sensor is initially detected during the second period and the ultrasonic echo is received within a predetermined time.

In this case, a frequency of the transmission pulses may be in the middle of a resonance frequency and an anti-resonance frequency of the transducer.

Further, a self-vibration frequency of the transducer during the second period may be a resonance frequency of the transducer.

Further, the control unit may include a memory for storing the time of flight between the initial detecting time and the transmission time of the ultrasonic wave.

Further, the control unit may include a phase or frequency change detecting unit that detects the phase or frequency change of the transducer.

Meanwhile, a method for driving an ultrasonic sensor according to an embodiment of the present invention may comprise: providing a transmission pulse to the ultrasonic sensor to transmit an ultrasonic wave and for receiving an ultrasonic echo for the ultrasonic wave; amplifying an electrical signal for the ultrasonic echo; converting the amplified electrical signal into an original digital signal; performing envelope-extraction-processing on the original digital signal and generating an envelope-extraction-processed signal; and outputting a distance between the ultrasonic sensor and an external object based on the original digital signal and the envelope-extraction-processed signal, wherein the outputting the distance includes: monitoring a vibration frequency of a transducer of the ultrasonic sensor based on the original digital signal at least during a second period and analyzing the envelope-extraction-processed signal during at least the third period provided that there are a first period in which the transducer is vibrated according to the transmission pulse, the second period in which the transducer is self-vibrated after the provision of the transmission pulse is stopped, and the third period in which the transducer stops the self-vibration; and, outputting the distance between the ultrasonic sensor and the external object determined based on a time of flight between an initial detecting time and a transmission time of the ultrasonic wave, the initial detecting time being determined when a change of the vibration frequency of the transducer is initially detected during the second period and the ultrasonic echo is received within a predetermined time.

In this case, a frequency of the transmission pulses may be in the middle of a resonance frequency and an anti-resonance frequency of the transducer.

Further, the vibration frequency of the transducer during the second period is a resonance frequency of the transducer.

Further, the outputting the distance may include storing the time of flight between the initial detecting time and the transmission time of the ultrasonic wave.

Further, the change of the vibration frequency is detected based on a phase or frequency change of the transducer.

According to the present invention, a position of the distance from near external objects can be more accurately measure. The distance from the external objects are output based on the time of flight from transmission of ultrasonic waves to the detection of a first ultrasonic echo of the ultrasonic waves when the first ultrasonic echo of the ultrasonic waves is detected by sensing the change of the frequency or the phase of the transducer of the ultrasonic sensor during a reverberation period in which the transducer of the ultrasonic sensor continues to be vibrated after the ultrasonic sensor stops the transmission of the ultrasonic waves and an second ultrasonic echo of the ultrasonic waves are received within a predetermined time from the receipt of the first ultrasonic echo. Conventionally, it was impossible to measure the distances of external objects during the reverberation period and subsequently the possible distance range of detecting external objects was limited more than 30 cm. But, according to the present invention, the ultrasonic sensor can measure the distance of a near external object of about 5 cm.

DESCRIPTION OF REFERENCE NUMERALS

100: Ultrasonic sensor
200: Ultrasonic sensor driving device
220: Amplifier
230: Analog-to-digital converter
240: Signal processing unit
250: Control unit:

DETAILED DESCRIPTION OF THE INVENTION

Hereinafter, embodiments of the present invention will be described in detail with reference to the accompanying drawings. It should be understood, however, that the invention is not limited to the disclosed embodiments, but may be embodied in many different forms and should not be construed as being limited to the embodiments set forth herein. Rather, these embodiments are provided so that this disclosure will be thorough and complete, to be fully informed. Also, for purposes of explanation, components may be exaggerated or reduced in size in the drawings.

The following embodiments are to be considered as illustrative and not restrictive, and the scope of the present invention is not limited only by the following embodiments.

Figure 1:
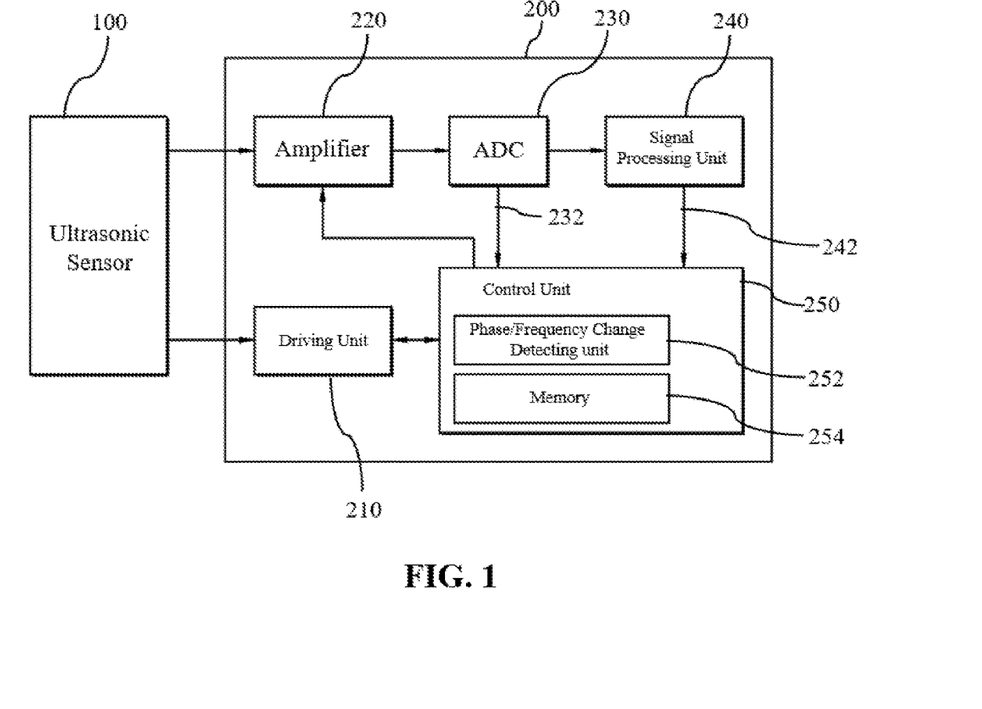
FIG. 1 illustrates a block diagram of an ultrasonic sensor driving apparatus according to an embodiment of the present invention.

FIG. 1 shows a configuration of an apparatus for driving an ultrasonic sensor according to an embodiment of the present invention.

Referring to FIG. 1, an ultrasonic sensor driving system according to an embodiment of the present invention includes an ultrasonic sensor 100 and an ultrasonic sensor driving device 200.

The ultrasonic sensor 100 includes a transducer. The ultrasonic sensor 100 vibrates the transducer according to the transmission pulse received from the ultrasonic sensor driving device 200 to transmit ultrasonic waves. Then, when the echoes of the ultrasonic waves reflected from an object vibrates the transducer again, the transducer converts the vibration into an electric signal and outputs the electric signal. Generally, the transmission and reception of the ultrasonic waves are separated into a transmission period and a reception period in terms of time, and the transmission and reception are performed sequentially and repetitively.

The ultrasonic sensor driving device 200 includes a driving unit 210, an amplifier 220, an analog-to-digital converter (ADC) 230, a signal processing unit 240, and a control unit 250. The ultrasonic sensor driving device 200 analyzes the received ultrasonic echoes for the ultrasonic waves through the transducer of the ultrasonic sensor 100 to calculate the distance to an external object.

The driving unit 210 transmits ultrasonic waves by vibrating the transducer by providing transmission pulses to the transducer. The ultrasonic sensor 100 converts received ultrasonic echoes for the transmitted ultrasonic waves into electrical signals. The amplifier 220 amplifies the electrical signals for the received ultrasonic echoes 414 and 418. The driving unit 210 outputs transmission pulses so that the transducer can be vibrated at a frequency having a value between the resonance frequency and the anti-resonance frequency of the transducer of the ultrasonic sensor 100 considering the reception sensitivity of the transmitted ultrasonic waves and the received ultrasonic echoes.

The analog-to-digital converter 230 converts the amplified signals in the amplifier 220 into digital signals and transmits the digital signals to the signal processing unit 240. Further, according to the present invention, the digital signals converted by the analog-to-digital converter 230 is input to the control unit 250 as original digital signals 232.

The signal processing unit 240 is a module for converting and processing the ultrasonic waves into analytical signals which can be analyzed in the control unit 250, such as eliminating the noise of the electric signals for the ultrasonic echoes and extracting the envelope from the electric signals. For example, the signal processing unit 240 may include a bandpass filter that filters a certain range of frequencies around a transmission frequency through various digital filters, an envelope extractor that extracts an envelope signals from signals passed through the bandpass filter, and/or a low-pass filter for filtering the noise of the extracted envelop signals.

The control unit 250 includes a phase and/or frequency change detection unit 252 and a memory 254, and analyzes the envelope-extraction-processed digital signals to output a distance to an external object.

Figure 2:
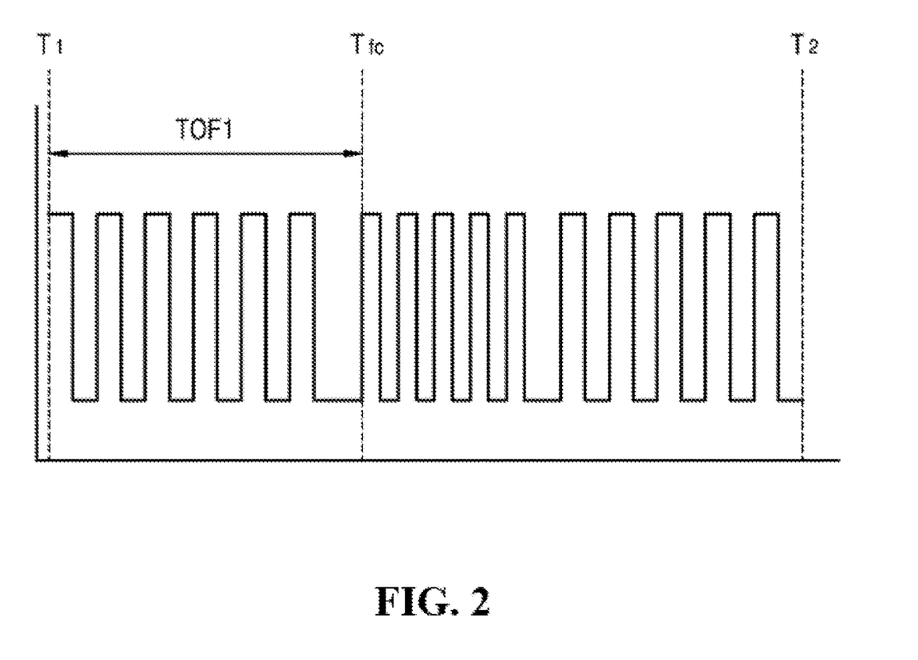
FIG. 2 illustrates a graph of an original digital signal received in a reverberation period according to an embodiment of the present invention.
Figure 3:
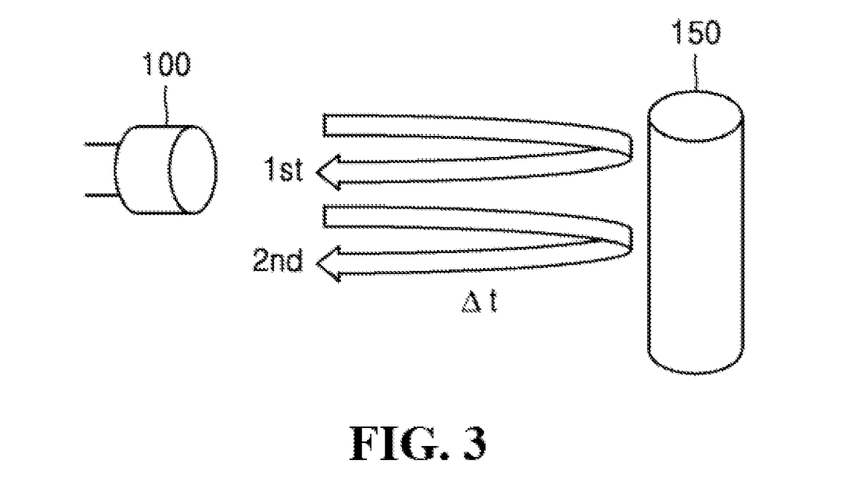
FIG. 3 illustrates an example in which ultrasonic waves are reflected two or more times according to an embodiment of the present invention.
Figure 4:
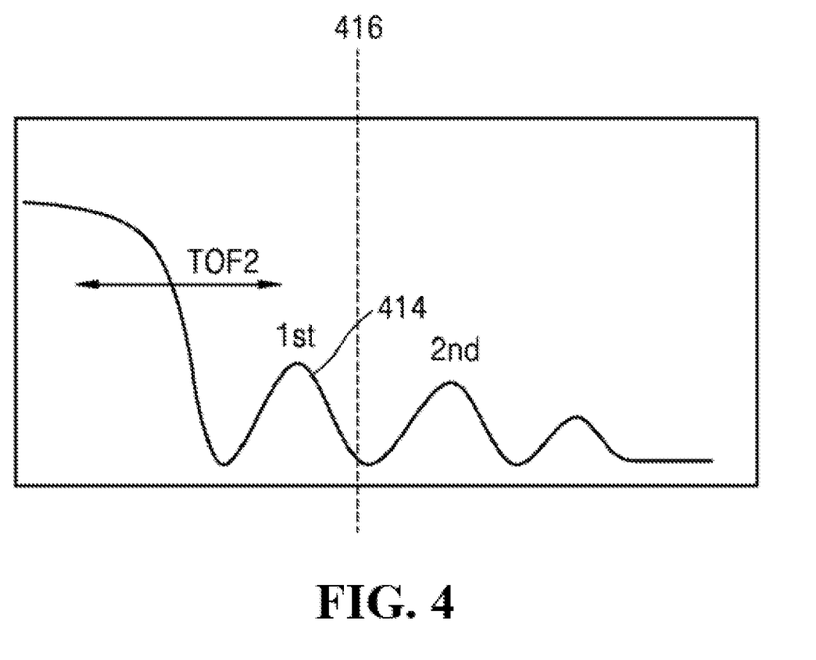
FIG. 4 illustrates a diagram in which ultrasonic echoes are received two or more times according to an embodiment of the present invention.

Hereinafter, the principle of the present invention will be described with reference to FIGS. 2 to 5, and then the operation of the control unit 250 will be described in detail. Hereinafter, a distance measuring method using the ultrasonic sensor of the present invention will be described in detail with reference to FIGS. 2 to 5. FIG. 2 shows a graph of original digital signals 232 of the second period which is the reverberation period. FIG. 3 is a diagram for explaining reflections of the ultrasonic signals between the ultrasonic sensor 100 and the external object adjacent to the ultrasonic sensor 100. FIG. 4 shows a graph of the signals for the envelope extraction processed signals. And FIG. 5 shows a diagram for transmission and reception cycles of the ultrasonic sensor 100 according to the present invention.

First, with reference to FIG. 5, a transmission period and a reception period of ultrasonic waves will be described.

Figure 5:
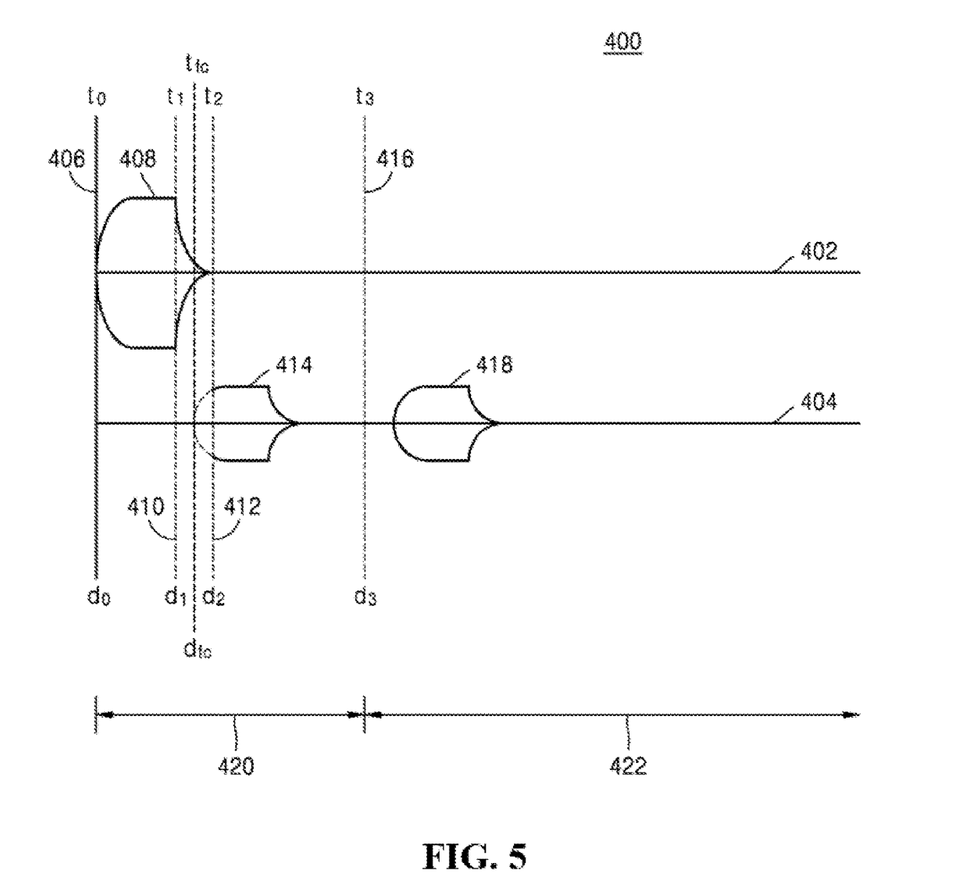
FIG. 5 illustrates an example of a transmitted ultrasonic wave and two or more ultrasonic echoes received multiple times according to an embodiment of the present invention.

The ultrasonic sensor 100 is driven in the transmission period and reception period as shown in FIG. 5.

Referring to 5, the transmission and reception periods include a first period ($t_0$-$t_1$) in which the transducer of the ultrasonic sensor 100 is vibrated by transmission pulses of the driving unit 210, a second period ($t_1$-$t_2$) in which the transducer of the ultrasonic sensor 100 continues to be vibrated (self-vibrated) after the driving unit 210 stops to provide the transmission pulses, a third period ($t_2$-until the driving unit 210 provides the next transmission pulses) in which the transducer stops the self-vibration. In the following description, the control of the ultrasonic sensor 100 by the control unit 250 in the above-described transmission and reception period will be described in detail.

As described above, the driving unit 210 provides transmission pulses in the first period to vibrate the transducer of the ultrasonic sensor 100, and then stops providing the transmission pulses upon entering the second period. Then, the transducer is self-vibrated at the resonance frequency and the intensity of the self-vibration gets to be attenuated. The self-vibration and the attenuation stops at the end of the second period. Such attenuation and self-vibration is called a reverberation. After the reverberation is finished, the transducer stops vibrating unless the echoes of the transmitted ultrasonic waves are received until the next transmission pulses are provided (the third period).

A conventional ultrasonic sensor driving apparatus cannot process received signals during a reverberation period (ring time) because it is difficult to extract accurate ultrasonic echoes due to the influence of the reverberation in the second period (the reverberation period). Therefore, it was impossible to measure a distance to an external object during the reverberation period, and there was a limitation in measuring a position of an external object very adjacent to the conventional ultrasonic sensor. In the case of the conventional ultrasonic sensor mounted on the automobile, the measurement was impossible within the range of 30 cm from the ultrasonic sensor.

Meanwhile, referring to FIG. 2, the control unit 250 monitors the original digital signals 232 received from the analog-to-digital converter 230 during the second period. Even though the transducer of the ultrasonic sensor 100 is not driven at the resonance frequency by the transmission pulses in the first period, the self-vibration frequency of the transducer rapidly changes to the physical resonance frequency of the transducer in the second period. However, when the ultrasonic echoes of the ultrasonic waves reflected from the external object is received in the second period, the self-vibration frequency of the transducer changes to a composite frequency of the resonance frequency and the frequency of the ultrasonic echoes of the reflected ultrasonic waves.

A phase and/or frequency shift detection unit 252 detects the starting time ($T_{fc}$) when the transducer starts to vibrate at the composite frequency, and the starting time can be stored as a potential time of flight ($TOF_1$) in a memory 254.

Referring to FIG. 3, if the transducer is vibrated to emit ultrasonic waves when the transducer and the object are in close proximity to each other, the ultrasonic echoes reflected from the object are secondarily reflected by the transducer again. The ultrasonic waves reflected from the transducer is reflected secondarily from the object once again. The transmitted ultrasonic waves are continuously attenuated while moving in space, and these secondary reflections are repeated until they are completely disappeared. Therefore, even when transmitting the ultrasonic waves one time, if the object is in a very close position, the ultrasonic echoes are received two or more times by mutual repetitive reflections. In the present invention, this principle is used to extend the measurable distance in the proximity area.

According to the present invention, the control unit 250 first detects the ultrasonic echoes 414 by the phase and/or frequency change detector 252 during the second period. In this case, the distance to the external object is output based on the potential time of flight which is the starting time detected by the phase and/or frequency change detector 252 and stored in the memory 254 if the control unit 250 receives the ultrasonic echoes 414 within a predetermined time 416 (See FIGS. 4 and 5).

As shown in FIG. 5, when the ultrasonic echoes 414 due to the reflections of the external object extend over the second and third sections in time, the ultrasonic echoes 414 could be received within the predetermined time 416. Therefore, the distance to the external object can be output based on the time ($T_{fc}$) at which the frequency and/or phase change of the self-vibration is detected. Accordingly, in the embodiment of FIG. 5, the distance to the object in the reverberation period can be calculated without considering the echo 418 for the secondary reflected waves.

Conventionally, an attempt has been made to measure the flying distance with respect to the reverberation period. However, in the case of the conventional configuration, most of the signals during the reverberation period are filtered out due to the self-vibration of the transducer. For example, there was a conventional configuration to measure a distance during the reverberation period in which the difference between detection times of the first reflected signal and secondarily reflected signal is output as the distance if the difference is less than a predetermined time. However, since the secondarily reflected signal has very weak intensity, it was difficult to measure the distance during the reverberation period.

However, in the present invention, the reflected waves of the object in the reverberation period can be accurately detected through monitoring the phase and/or frequency change of the original digital signals 232 in the reverberation period. In addition, the accuracy of detection of nearby objects is much enhanced by using secondary reflections of nearby objects. However, as shown in FIG. 5, even if secondary reflections of the object is not considered, it is possible to detect the time of flight of the nearby objects accurately by recognizing it as a nearby object if the envelope of the external object is detected within the predetermined time.

Hereinafter, the method for driving an ultrasonic sensor according to an embodiment of the present invention will be described with reference to FIG. 6.

Figure 6:
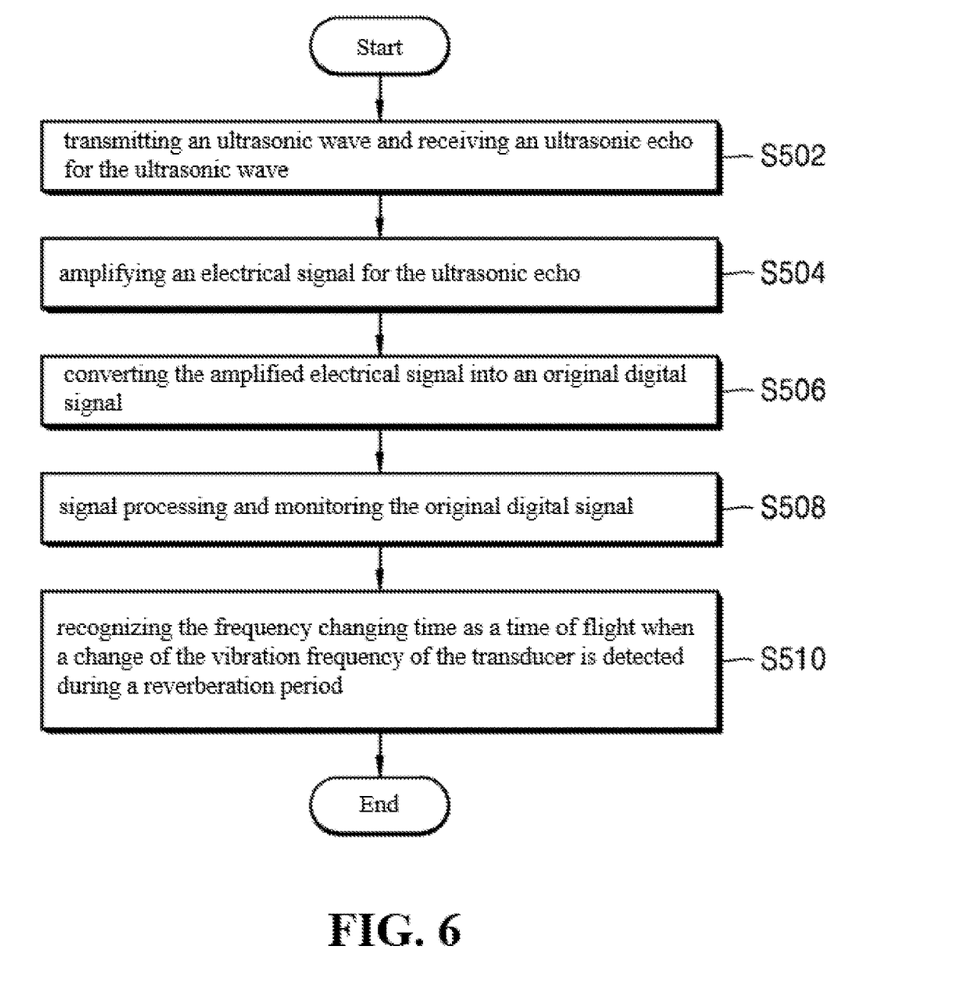
FIG. 6 illustrates a flowchart of a method for driving an ultrasonic sensor according to an embodiment of the present invention.

FIG. 6 illustrates a flowchart of an ultrasonic sensor driving method according to an embodiment of the present invention.

Ultrasonic waves are transmitted according to transmission pulses 408 by the ultrasonic sensor 100 and the ultrasonic echoes 414 of the ultrasonic waves are received (step S502).

The amplifier 220 amplifies the electrical signal of the received ultrasonic echoes 414 (step S504).

The analog-to-digital converter 230 converts the amplified electrical signal into a digital signal (step S506) and provides the digital signal as an original digital signal 232 to the control unit 250 and the signal processing unit 240.

The signal processing unit 240 performs an envelope extraction processing on the original digital signal, and the control unit 250 monitors the original digital signals 232 to detect whether there is a frequency change in the second period (reverberation period) (step S508).

The control unit 250 analyzes the original digital signal to determine whether there is any frequency and/or phase change detected during the second period and an external object is detected based on the extracted envelope within a predetermined time. And the control unit 250 recognizes the distance calculated based on the frequency and/or phase change as an effective distance and outputs the effective distance to the external object (step S510).

Specifically, provided that there are a first period ($t_0$-$t_1$) in which the transducer of the ultrasonic sensor 100 is vibrated according to the transmission pulses provided by the driving unit 210, a second period ($t_1$-$t_2$) in which the transducer continues to vibrated (self-vibrated) after the driving unit stops to provide the transmission pulses and a third period ($t_2$-until the driving unit 210 provides the next transmission pulses) in which the transducer stops the self-vibration, the step S510 of outputting the effective distance to the external object includes the step of analyzing the original digital signals during the second period and the step of analyzing the envelope-extraction-processed digital signals during the third period.

If there is any frequency and/or phase change during the second period and the ultrasonic echoes 414 are detected during the predetermined time, the control unit 250 recognizes the distance calculated based on the frequency and/or phase change as an effective distance and outputs the effective distance to the external object.

According to the present invention, in the case where the phase and/or frequency change of the transducer during a reverberation period is initially detected during a reverberation period in which the transducer self-vibrated after the provision of the transmission pulses is stopped, and the ultrasonic echoes are received within the predetermined time, it is possible to more precisely measure the position of the adjacent external object by outputting the distance to external objects based on the time of flight calculated based on the initial detection time and the time of transmission of the ultrasonic waves. In the past, since it was impossible to measure the object distance in the reverberation period, only objects that are more than 30 cm far from the ultrasonic sensor can be detected. However, according to the present invention, it is possible to detect external objects that are about 5 cm.

While the present invention has been described about what is presently considered to be practical exemplary embodiments, it is to be understood that the invention is not limited to the disclosed embodiments, but, on the contrary it is to be understood that the invention is not limited to the disclosed embodiments and intended to cover various modifications and similarities. Accordingly, the scope of the present invention should not be construed as being limited to the embodiments described, and it is to be interpreted that the scope of the present invention covers not only the claims of the following patent claims but also equivalents thereof.

What is claimed is:

1. An apparatus for driving an ultrasonic sensor comprising:
   a driving unit for providing a transmission pulse to the ultrasonic sensor to transmit an ultrasonic wave and for receiving an ultrasonic echo for the ultrasonic wave;
   an amplifier for amplifying an electrical signal for the ultrasonic echo;
   an analog-to-digital converter for converting the amplified electrical signal into an original digital signal;
   a signal processing unit for performing envelope-extraction-processing on the original digital signal and generating an envelope-extraction-processed signal; and
   a control unit for outputting a distance between the ultrasonic sensor and an external object based on the original digital signal and the envelope-extraction-processed signal,
   wherein the control unit monitors a frequency or phase change of vibration of a transducer of the ultrasonic sensor based on the original digital signal at least during a second period and analyses the envelope-extraction-processed signal during at least a third period provided that there are a first period in which the transducer is vibrated according to the transmission pulse, the second period in which the transducer is self-vibrated after the provision of the transmission pulse is stopped, and the third period in which the transducer stops the self-vibration, and
   wherein the control unit outputs the distance between the ultrasonic sensor and the external object determined based on a time of flight between an initial detecting time and a transmission time of the ultrasonic wave, the initial detecting time being determined when the frequency or phase change of the transducer of the ultrasonic sensor is initially detected during the second period and the ultrasonic echo is received within a predetermined time.

2. The apparatus of claim 1, wherein a frequency of the transmission pulses is in the middle of a resonance frequency and an anti-resonance frequency of the transducer.

3. The apparatus of claim 1, wherein a self-vibration frequency of the transducer during the second period is a resonance frequency of the transducer.

4. The apparatus of claim 1, wherein the control unit includes a memory for storing the time of flight between the initial detecting time and the transmission time of the ultrasonic wave.

5. The apparatus of claim 1, wherein the control unit includes a phase or frequency change detecting unit that detects the phase or frequency change of the transducer.

6. A method for driving an ultrasonic sensor comprising:
   providing a transmission pulse to the ultrasonic sensor to transmit an ultrasonic wave and for receiving an ultrasonic echo for the ultrasonic wave;
   amplifying an electrical signal for the ultrasonic echo;
   converting the amplified electrical signal into an original digital signal;
   performing envelope-extraction-processing on the original digital signal and generating an envelope-extraction-processed signal; and
   outputting a distance between the ultrasonic sensor and an external object based on the original digital signal and the envelope-extraction-processed signal,
   wherein the outputting the distance includes:
      monitoring a vibration frequency of a transducer of the ultrasonic sensor based on the original digital signal at least during a second period and analyzing the envelope-extraction-processed signal during at least the third period provided that there are a first period in which the transducer is vibrated according to the transmission pulse, the second period in which the transducer is self-vibrated after the provision of the transmission pulse is stopped, and the third period in which the transducer stops the self-vibration; and,
      outputting the distance between the ultrasonic sensor and the external object determined based on a time of flight between an initial detecting time and a transmission time of the ultrasonic wave, the initial detecting time being determined when a change of the vibration frequency of the transducer is initially detected during the second period and the ultrasonic echo is received within a predetermined time.

7. The method of claim 6, wherein a frequency of the transmission pulses is in the middle of a resonance frequency and an anti-resonance frequency of the transducer.

8. The method of claim 6, wherein the vibration frequency of the transducer during the second period is a resonance frequency of the transducer.

9. The method of claim 6, wherein the control unit includes a memory for storing the time of flight between the initial detecting time and the transmission time of the ultrasonic wave.

10. The method of claim 6, wherein the change of the vibration frequency is detected based on a phase or frequency change of the transducer.

* * * * *